Sept. 12, 1939.  D. S. FAHRNEY  2,172,370
SLOT FOIL AIRCRAFT WING
Filed Jan. 10, 1938  3 Sheets-Sheet 1
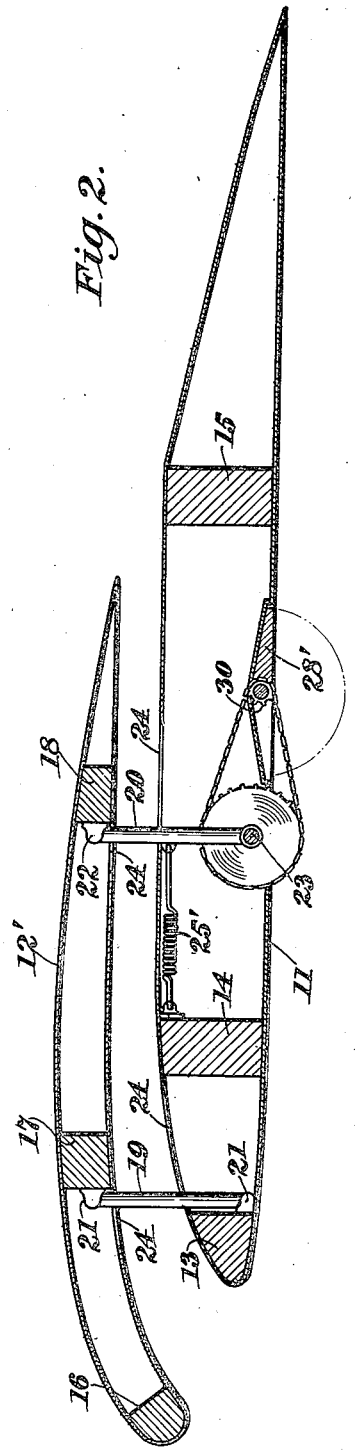
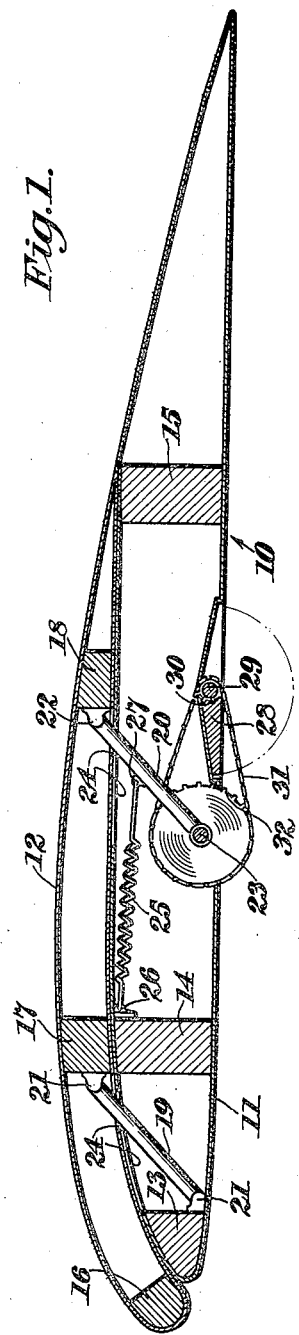
INVENTOR
Delmer S. Fahrney
BY
Ransom K. Davis
ATTORNEY

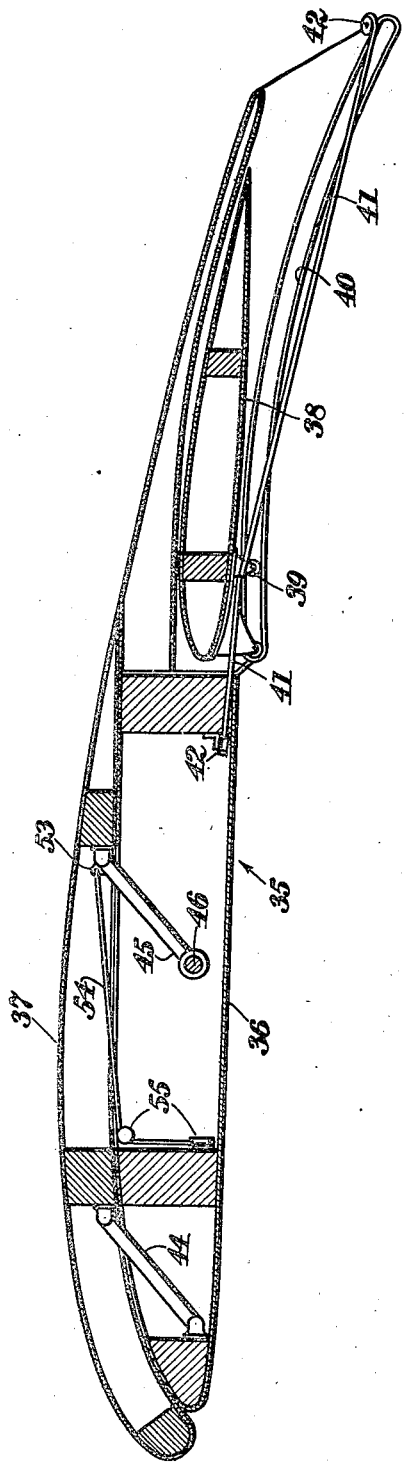

Sept. 12, 1939.   D. S. FAHRNEY   2,172,370
SLOT FOIL AIRCRAFT WING
Filed Jan. 10, 1938   3 Sheets-Sheet 3

INVENTOR
Delmer S. Fahrney
BY
ATTORNEY

Patented Sept. 12, 1939

2,172,370

UNITED STATES PATENT OFFICE 2,172,370

SLOT FOIL AIRCRAFT WING

Delmer S. Fahrney, United States Navy

Application January 10, 1938, Serial No. 184,143

1 Claim. (Cl. 244—42)

(Granted under the act of March 3, 1883, as amended April 30, 1928; 370 O. G. 757)

This invention relates to a slot foil wing for aircraft, and has for an object to provide a small airfoil that can be made either to fold itself into the upper chamber of the main airfoil in such a way as to give a standard airfoil shape, or mechanical means can be provided to lift and move the airfoil either manually or automatically into such a position so as to effect a change in camber and in area, an increase in overall airfoil thickness, and give a well designed slot to increase the aerodynamic efficiency of the combination.

A further object of this invention is to provide a slot foil which may be so linked to a spoiler flap that the effort required to position the slot foil will be very small, because of the balance of pressures on the nose of the slot foil and on the spoiler flap.

A further object of this invention is to provide a slot foil which may be used in combination with a Fowler flap of the nature generally disclosed in U. S. Patent No. 1,670,852, May 22, 1928, to H. D. Fowler.

With the foregoing and other objects in view, the invention consists in the construction, combination and arrangement of parts hereinafter described and illustrated in the drawings, in which:

Fig. 1 is a sectional view of an aircraft wing to which the slot foil of this invention has been applied;

Fig. 2 is a view similar to Fig. 1, with the slot foil in operative position;

Fig. 3 is a sectional view of a modified application of this invention;

Figure 4:
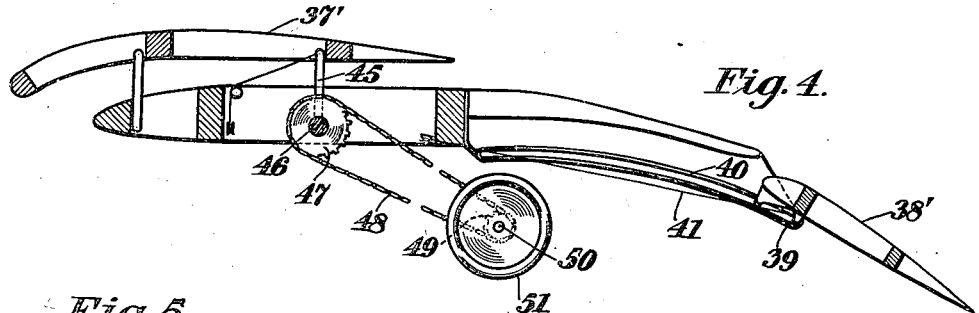
Fig. 4 is a view similar to Fig. 3, with the parts in operative position.

There is shown at 10 an aircraft wing whose completed contour is of the usual airfoil construction. This aircraft wing 10 includes a main airfoil 11 and a slot foil 12, which, when together in the position shown in Fig. 1, make up the usual completed airfoil contour of the wing 10. The main airfoil 11 has a plurality of wing spars such as shown at 13, 14, and 15, while the slot foil 12 likewise has a plurality of wing spars as shown at 16, 17, and 18, to assist in affording proper rigidity to each of the airfoil sections.

Airfoil 12 is connected to the main airfoil 11 by means of the parallel links 19 and 20, the link 19 being pivoted on brackets 21 on wing spars 13 and 17, while the link 20 is pivoted on a bracket 22 on wing spar 18 and affixed on a shaft 23, journaled within the main airfoil section 11, suitably positioned slots 24 being provided in the skin of the airfoil sections 11 and 12 to permit the linked motion.

A strong coil spring 25 is anchored at one end by the bracket 26 to the wing spar 14, and at the other end by a bracket 27 on the link 20, tending to move the airfoil section or slot foil 12 from the position shown in Fig. 1 to the position 12' shown in Fig. 2.

A spoiler flap 28 recessed within the bottom of main airfoil section 11 is secured to a shaft 29 and may move to the position 28' about the shaft 29. A sprocket gear 30 on shaft 29 is connected by sprocket chain 31 to another sprocket gear 32 on shaft 23.

In operation, at speeds higher than about ten miles an hour above the stalling point, the spring 25 is too weak to raise the airfoil section or slot foil 12 from the position 12 to the position 12', due to the pressure on the nose or leading edge of the complete contour of the aircraft wing 10. Below such speeds the spring 25 tends to contract toward the position 25' thereby starting to lift the slot foil 12 toward the position 12'. This causes shaft 23 through chain 31 to move the spoiler flap 28 downwardly into the air stream and as it is moved to the position 28', it assists the action of the spring 25 in moving the slot foil and holding it in the position 12'. The camber of the wing 10 is thus changed to provide an increase in thickness and in lift, thus diminishing the stalling speed and allowing the aircraft to land more slowly, and similarly, to allow the aircraft to take flight at a slower speed. Then when proper speed has been reached, pressure on the nose or leading edge of the slot foil 12 will force it downwardly from the position 12' against the action of the spring 25 and spoiler flap 28 so as to decrease the lift and permit the aircraft to travel at a higher speed.

Figure 5:
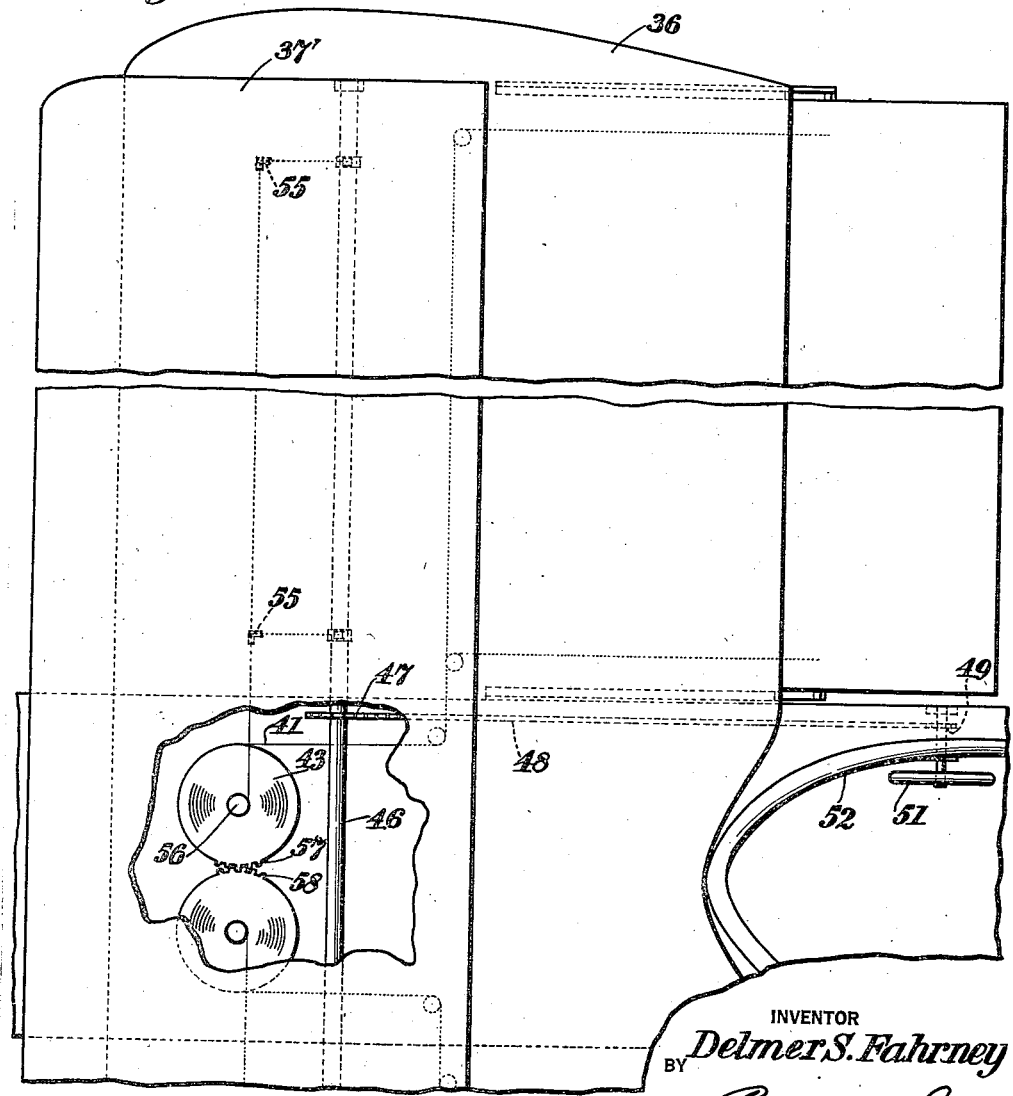
Fig. 5 is a top plan view of Fig. 4.

Instead of having the slot foil open automatically, as just described, it may be opened and closed manually, and further may be used in connection with a Fowler flap, as shown in U. S. Patent No. 1,670,852, above referred to. Such modification is shown in Figs. 3, 4 and 5, wherein the aircraft wing 35 includes a main airfoil section 36, a slot foil section 37 and an auxiliary wing or Fowler flap 38. The auxiliary wing or Fowler flap 38 is mounted on trolleys 39, movable in a trackway 40, and controlled by endless cable 41 secured thereto and passing over sheaves 42 to a control pulley 43. The slot foil section 37 is linked as at 44 and 45 to the main airfoil section 36, the link 45 being fixed at one end to a shaft 46. This shaft 46 is provided with a sprocket 47 connected by a sprocket chain 48 to a sprocket 49 on the control shaft 50 provided with a control wheel 51, located in the pilot's cockpit 52. Secured on a bracket 53 to the link 45 at one end thereof is an endless cable 54 passing over sheaves 55 to a small pulley 56 keyed on the same shaft as the pulley 43. Also keyed to this same shaft is a gear 57 which meshes with another gear 58, which in turn is connected to a complete similar construction on the wing surface to the other side of the pilot's cockpit.

In operation, the pilot may open the slot foil 37 to position 37' and simultaneously move the Fowler flap or auxiliary wing 38 to position 38' by rotating the control wheel 51, which rotates shaft 46 to move link 45 upwardly, and thus move slot foil 37 to position 37'. At the same time the cable 54 rotates the small pulley 56 and simultaneously rotates the large pulley 43, and through cable 41 moves the auxiliary wing or Fowler flap 38 to position 38', the ratio of the diameters of the small pulley 56 and the large pulley 43 being the same as the ratio of the movement of the slot foil 37 and auxiliary wing 38.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

An aircraft wing comprising a main airfoil section and a smaller slot foil section overlying its forward surface, said slot foil section being linked to said main airfoil section for movement upwardly and forwardly relative thereto to increase the camber and thickness of the aircraft wing when in the forward position and to restore the normal aircraft contour when in the rearward position, and means for moving said slot foil section to the forward position, said means being automatic, said automatic means including a yieldable means urging said slot foil to the forward position, parallel link means connecting said slot foil to said main airfoil section, a shaft to which said link means is secured, a spoiler flap in said main airfoil section, a shaft on which said spoiler flap is secured, and means securing said shafts for simultaneous movement whereby rotation of said spoiler flap assists in operating said slot foil.

DELMER S. FAHRNEY.